UNITED STATES PATENT OFFICE.

ROBERT A. ARCHIBALD, OF OAKLAND, CALIFORNIA.

LYMPH-GLAND EXTRACT AND METHOD OF MAKING SAME.

1,216,046.

Specification of Letters Patent.

Patented Feb. 13, 1917.

No Drawing.

Application filed April 6, 1916. Serial No. 89,446.

*To all whom it may concern:*

Be it known that I, ROBERT A. ARCHIBALD, a citizen of the United States, and a resident of Oakland, county of Alameda, and State of California, have invented a certain new and useful Lymph-Gland Extract and Method of Making Same, of which the following is a specification.

The invention relates to lymph gland extract.

An object of the invention is to provide a liquid or extract which when injected under the skin of a person or animal having an infection or any infectious disorder, toxemia, pathological condition or malady will produce a marked curative effect on the pathological condition, toxemia, disorder or malady or remove the infection, and furthermore when injected under the skin of an individual having hemophilia tendencies will produce a clotting of the blood and stop bleeding.

Another object of the invention is to provide a method of making such extract.

The invention possesses innumerable advantages in the treatment and cure of infections and pathological conditions, put I am not sufficiently certain as to the effects produced in the body by the inoculation of the extract to make an absolute statement as to the biological, bacteriological or physiological changes which occur after the inoculation. I am of the opinion that the extract in some manner greatly increases the number of or the activity or capacity of the leucocytes or white corpuscles of the blood, particularly the lymphocytes or the mononuclear variety of leucocytes. The leucocytes prey upon and take into their substance bacteria and other micro-organisms within the blood and tissues and if their number and activity are increased they operate to remove the infection.

I am further of the opinion that the action of the lympocytes or mononuclear types of leucocytes whose number and activity are increased by the inoculation of the extract is particularly to control chronic infections and toxemias. This variety of leucocyte produces an anzym of marked activity which causes a rapid and complete digestion and resolution of partially organized exudates and newly formed pathological tissues.

I am further of the opinion that the extract in some manner greatly increases the number and activity of the blood platelets with a coincident increase of the coagulability of the blood.

Whatever the action of the extract is, I know from experiment and clinical application that it is extremely useful in the treatment of infections, especially chronic infections, and diseases characterized by the formation of inflammatory exudates and proliferation of new tissues. It is also extremely useful in controlling hemorrhages incidental to surgical operations or hemorrhages due to pathological conditions.

The extract is not necessarily limited in its production to the exact process herein described but may be produced by modifications of such process. The extract is made from the lymph glands of such domestic animals as the ox, hog or sheep, the glands being in a normal condition free from infections or disease of any sort. The lymph glands are removed from the animal immediately after it is killed and are then placed in a one per cent. solution of lysol for the purpose of preserving the glands during transit from the abattoir to the laboratory.

When the glands reach the laboratory they are washed with sterile distilled water to remove the lysol solution. Each gland is flamed in a large Bunsen burner for the purpose of sterilizing the surface of the gland. The glands are then stripped of their fat and connective tissue capsule and are again flamed in the Bunsen burner to further insure sterility.

The glands are then ground in a meat grinder and to the resulting pulp is added sterile distilled water in the proportion of five volumes of water to one of gland pulp for the purpose of dilution. Sufficient ten per cent. trikresol solution or other preservative is added to make the whole a 0.3 per cent. trikresol solution, for the purpose of preserving the emulsion during subsequent operations.

The mixture of emulsion is then exposed to a temperature of 58° cent. in a water bath for one hour for the purpose of destroying the antiferments it may contain. The mixture is then placed in an incubator and exposed to a temperature of 37° cent. until autodigestion or lysis of the lymph gland cells is complete. After the lymph gland cells have undergone lysis or have been broken up, their protoplasmic contents have been liberated, and their soluble elements have been extracted a sufficient amount of ten per cent. solution of acetic acid is added to make the whole about 0.07 per cent. acetic acid for the purpose of precipitating the solid and semi-solid proteins from the mixture. Sufficient ten per cent. trikresol or other preservative is then added to make the whole 0.5 per cent. trikresol solution for preservative purposes. The acidity is then determined. Sufficient normal sodium hydrate solution is added to the emulsion to neutralize the acidity produced previously by the addition of the acetic acid solution.

The mixture is then filtered first through filter paper and then through a Berkfeld filter for the purpose of removing all solid material from the mixture. The resulting product being a watery clear fluid is put in ampuls of varying capacity, the ampuls are sealed and together with their contents are exposed to a temperature of 58° cent. for one hour for the purpose of sterilizing.

Each lot of lymph gland extract is carefully examined bacteriologically and biologically to determine if it is sterile, and its ability to produce certain blood changes is determined by the inoculation of definite quantities into experimental animals such as guinea pigs and rabbits.

The effect of lymph gland extract when injected subcutaneously is to increase the number of leucocytes especially the lymphocytes or mononuclears which are believed to be the most active of all the white blood cells in the control of chronic infectious diseases, malignant and benign tissue changes, the resolution of inflammatory exudates and other pathological conditions; also to increase the number of blood platelets and to considerably increase the coagulability of the blood, thereby controlling hemorrhages both surgical and pathological in character.

I claim:

1. An extract, in soluble form, neutral in reaction, which is obtained from the liberated protoplasm of digested normal lymph gland cells in permanent solution and possessing the characteristics when injected parenterally of stimulating the production of a leucocytosis and increasing the activity of the individual leucocytes particularly the lymphocytes or mononuclear type of leucocytes and stimulating the production of blood platelets and increasing their activity.

2. The method of preparing lymph gland extract which consists of grinding up normal lymph glands of healthy animals, adding distilled water to the resultant pulp, adding a preservative, heating the mixture to destroy any antiferments it may contain, incubating the mixture to facilitate digestion or lysis, adding an acid solution to precipitate the solid and semi-solid proteins to facilitate filtering and obtain a watery clear fluid.

3. The method of preparing lymph gland extract which consists of grinding up normal lymph glands from healthy animals, adding distilled water, five volumes of water to one volume of lymph gland pulp, making the mixture 0.3 per cent. trikresol as a preservative, exposing the mixture to a temperature of 58° centigrade to destroy any antiferments it may contain, incubating the mixture to facilitate autodigestion or lysis, making the mixture 0.07 per cent. acetic acid to precipitate the solid and semi-solid proteins and facilitate filtering, to remove cellular debris and proteins not in solution, adding a preservative thereto to bring the percentage of trikresol up to 0.5 per per cent., neutralizing its acidity with normal sodium hydrate solution, filtering and ampuling and sterilizing the water clear fluid at a temperature of 58° centigrade for an hour.

In testimony whereof, I have hereunto set my hand at Oakland, California, this 31st day of March 1916.

ROBERT A. ARCHIBALD.

In presence of—
ELLIS E. WOOD